Aug. 31, 1954   B. COOPER ET AL   2,687,849
PRINTING COUNTER HAVING TRUE NEGATIVE TOTAL MEANS
Filed Aug. 22, 1950   8 Sheets-Sheet 1
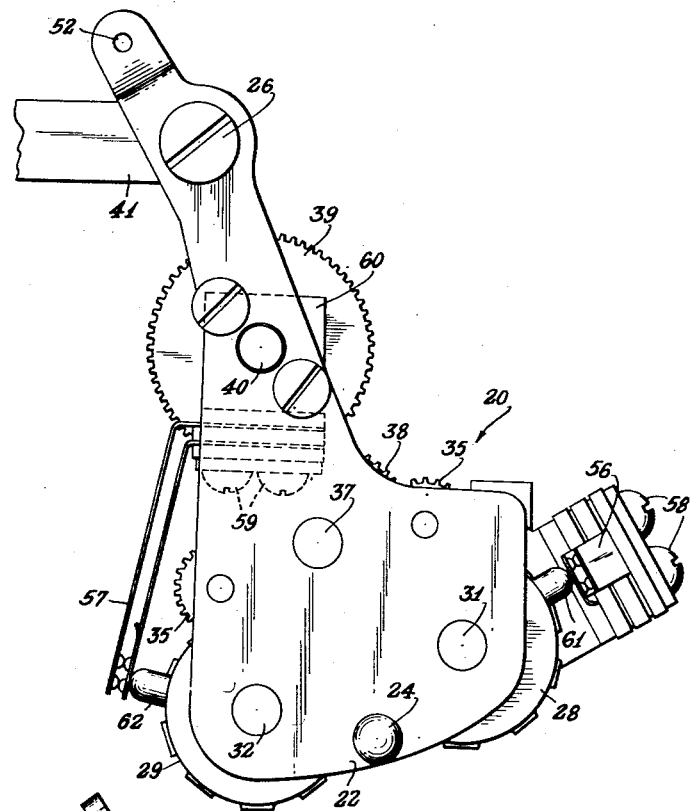
FIG. I.
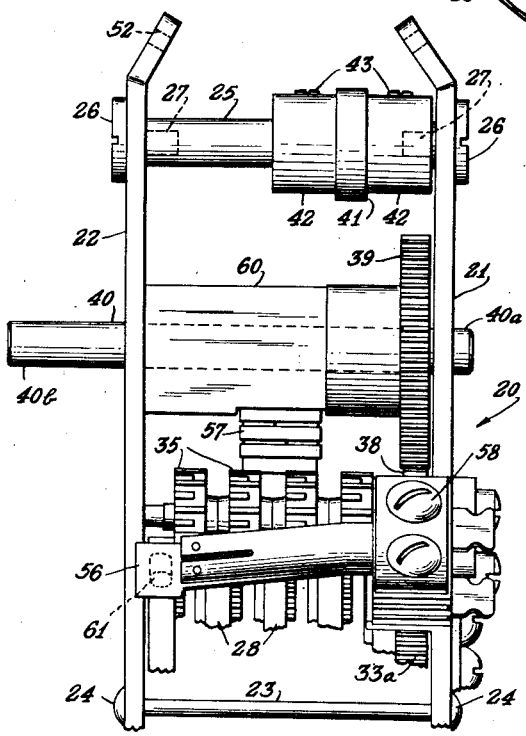
FIG. 2.
*INVENTORS.*
BENJAMIN COOPER
ALBERT HOHMANN
BY
*J. B. Felshin*
ATTORNEY.

Aug. 31, 1954   B. COOPER ET AL   2,687,849
PRINTING COUNTER HAVING TRUE NEGATIVE TOTAL MEANS
Filed Aug. 22, 1950   8 Sheets-Sheet 2
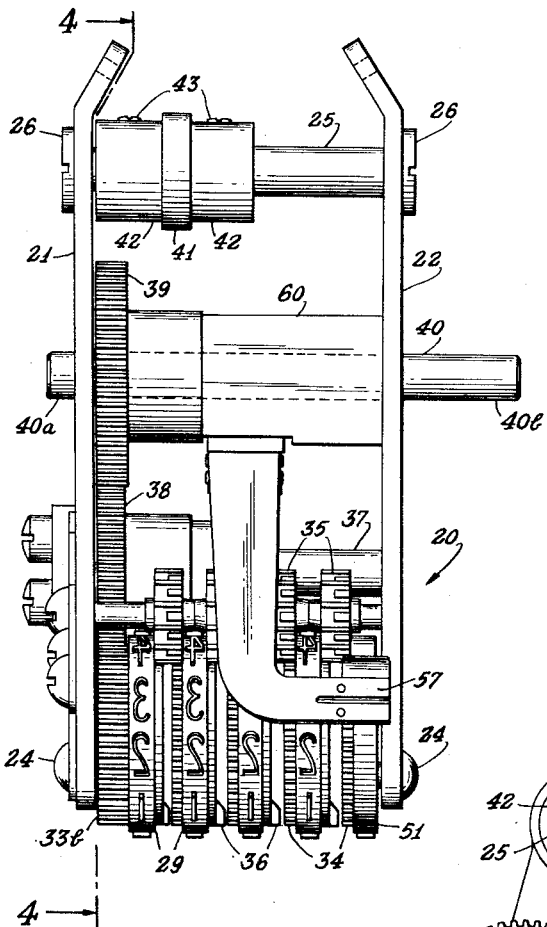
FIG. 3.
FIG. 4.
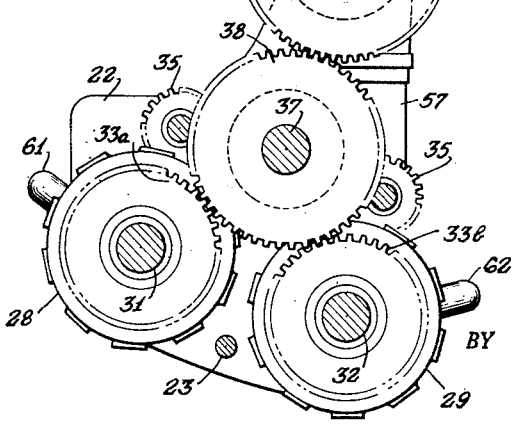
INVENTORS.
BENJAMIN COOPER
ALBERT HOHMANN
BY
*ATTORNEY.*

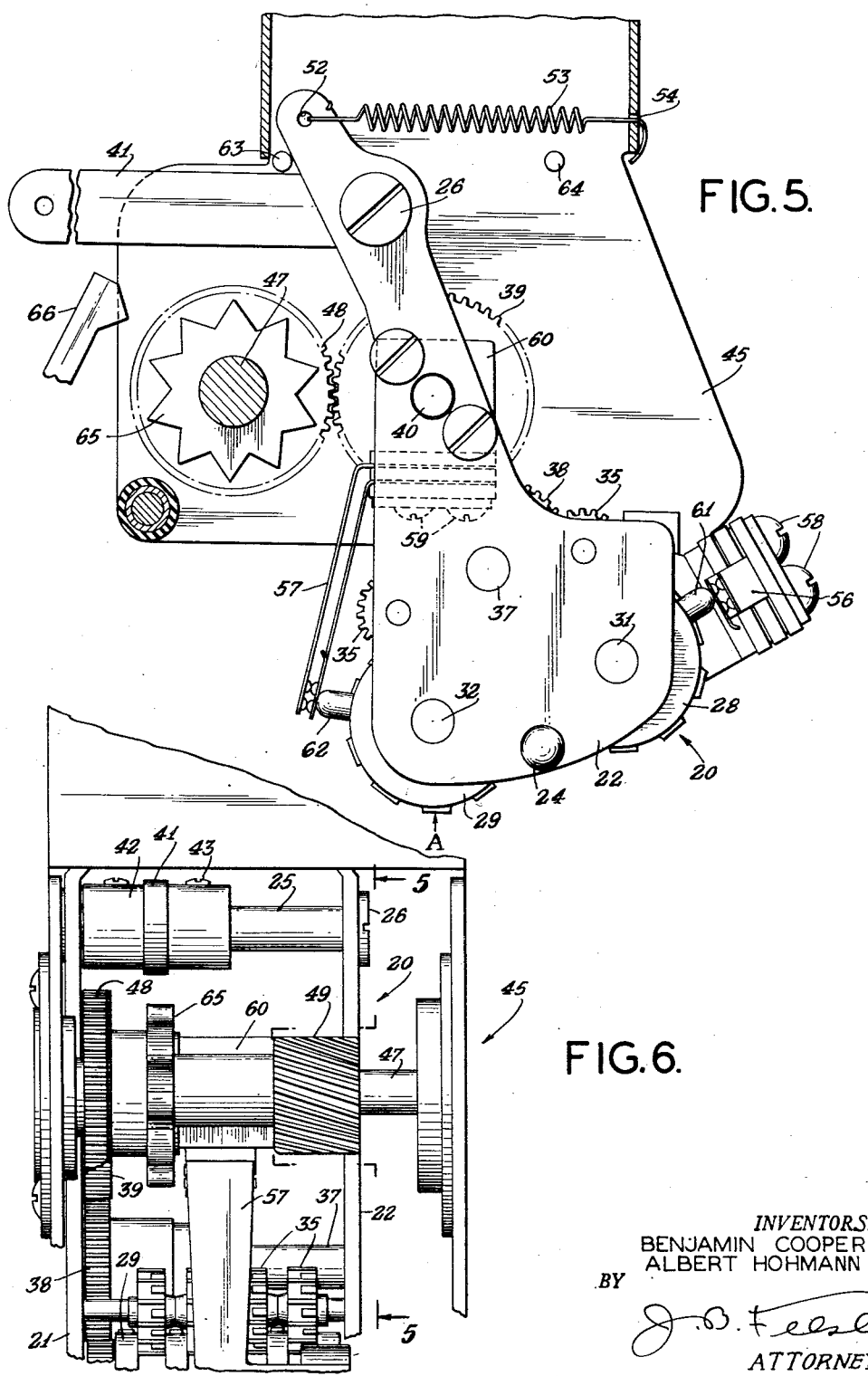

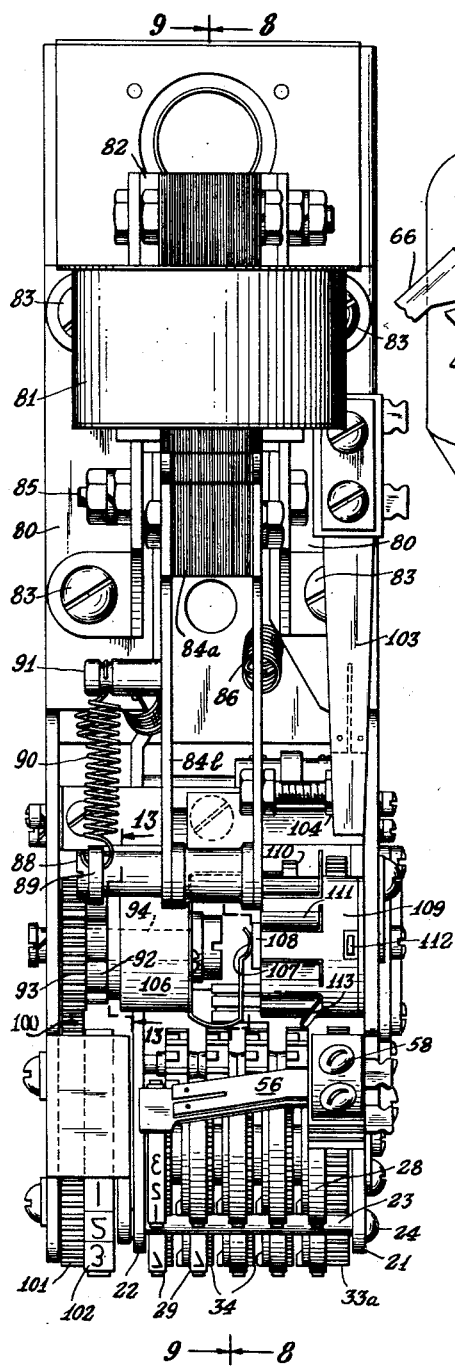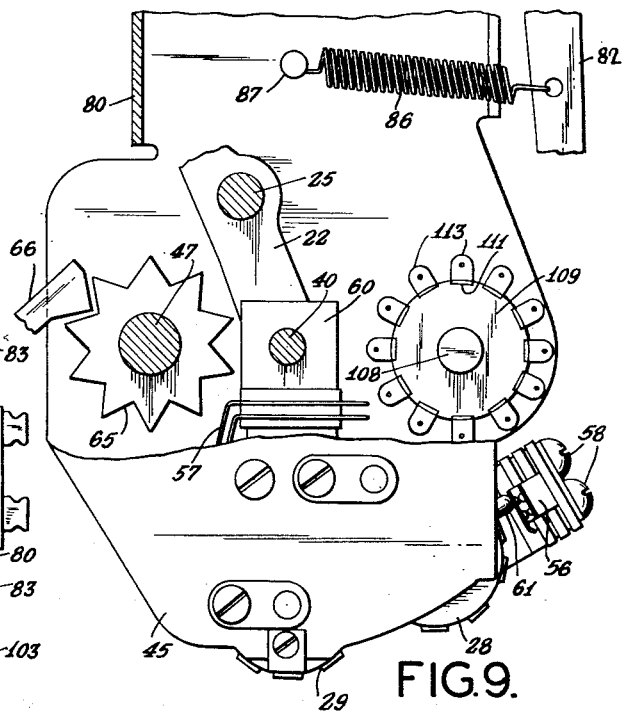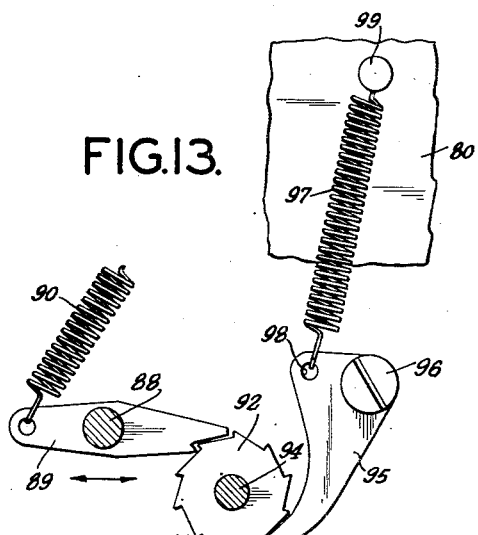

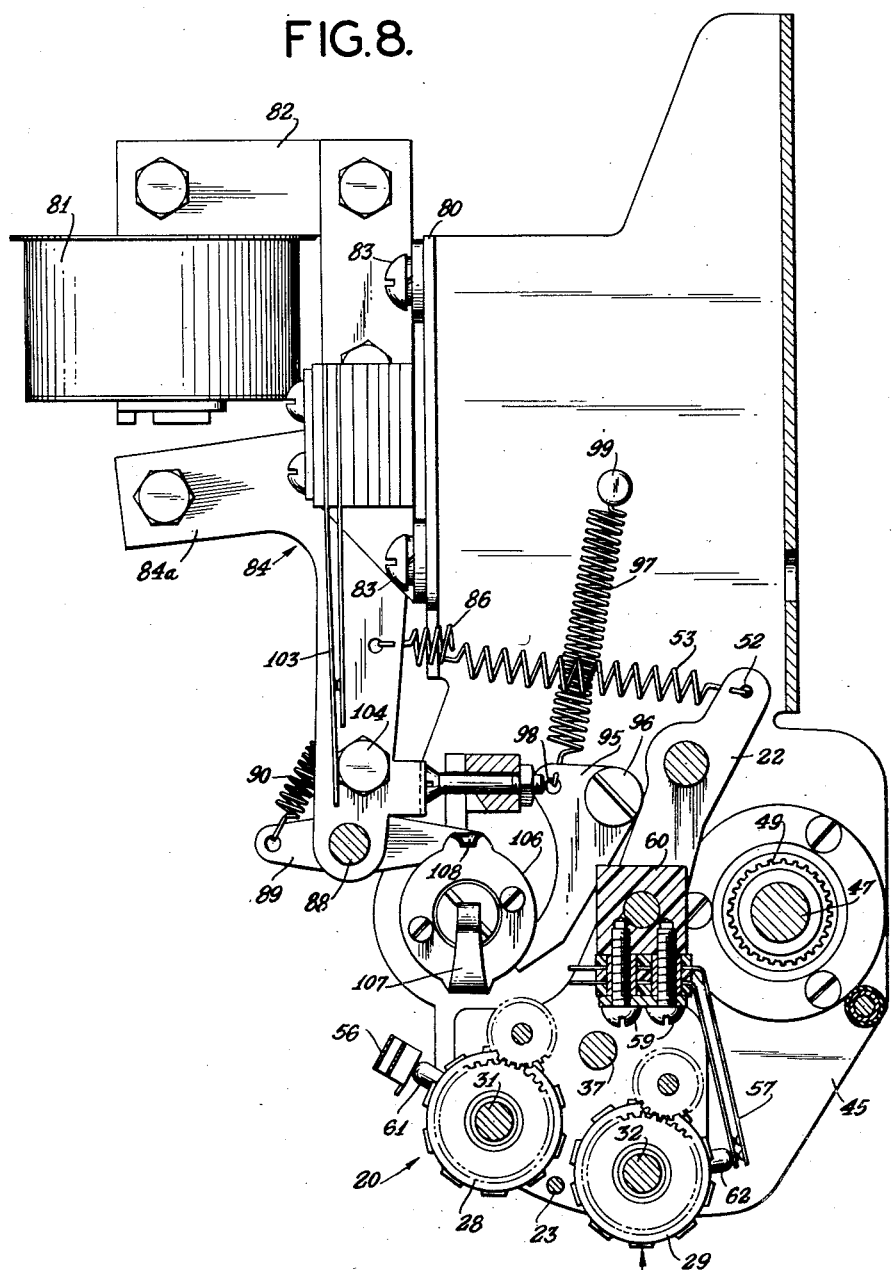

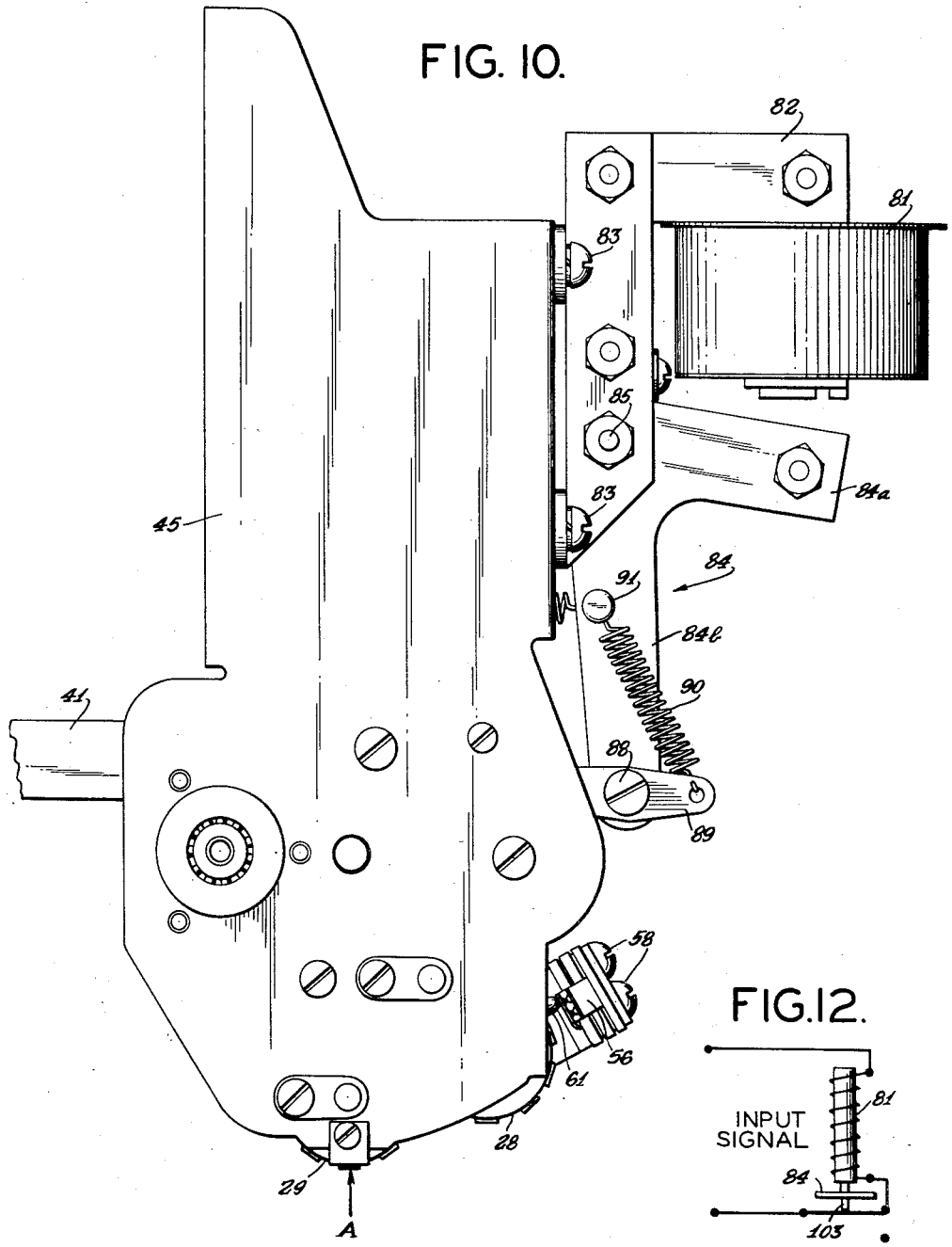
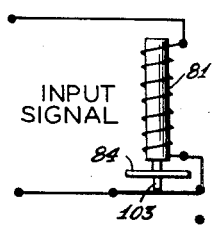

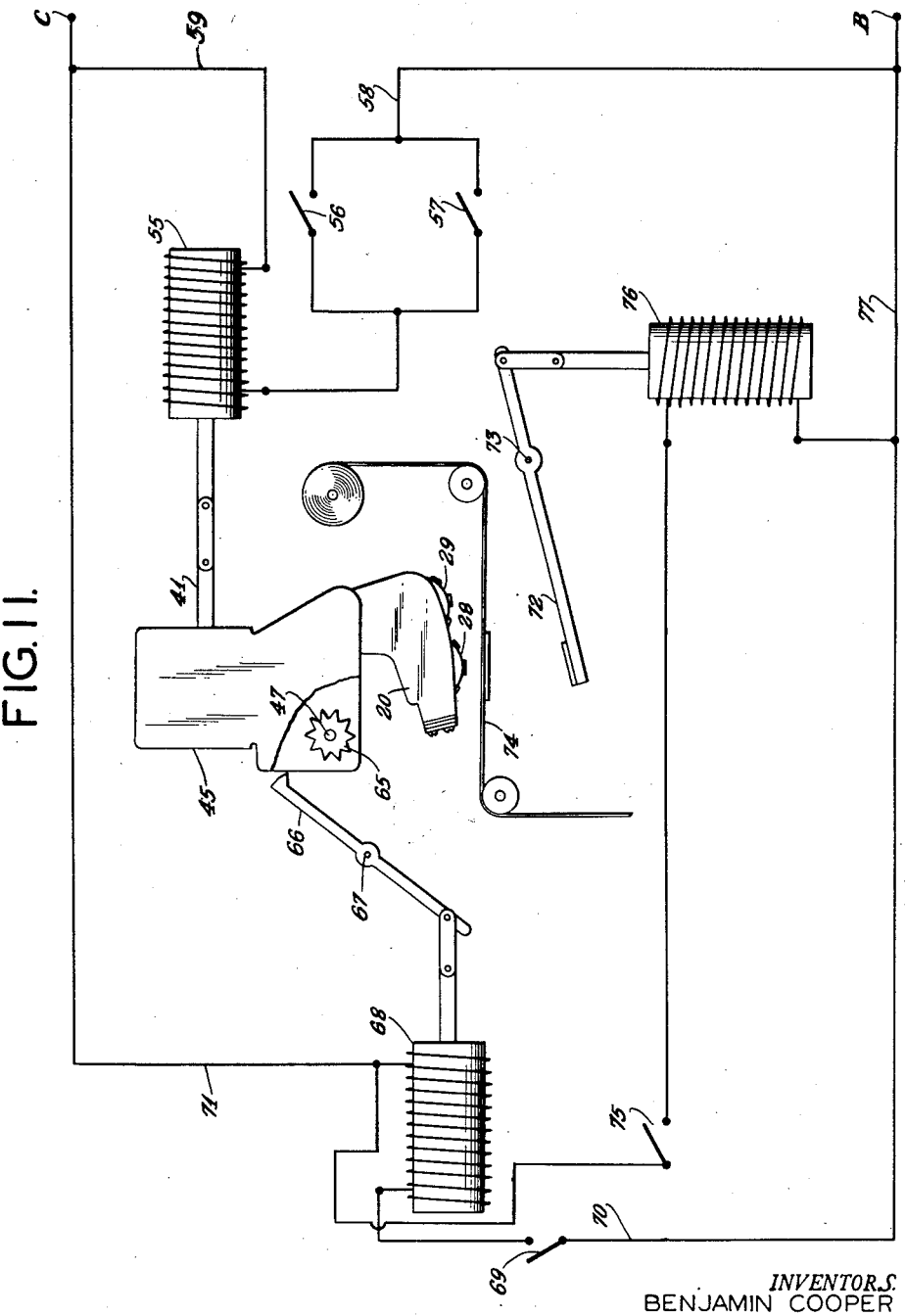

Aug. 31, 1954     B. COOPER ET AL     2,687,849
PRINTING COUNTER HAVING TRUE NEGATIVE TOTAL MEANS
Filed Aug. 22, 1950     8 Sheets-Sheet 8
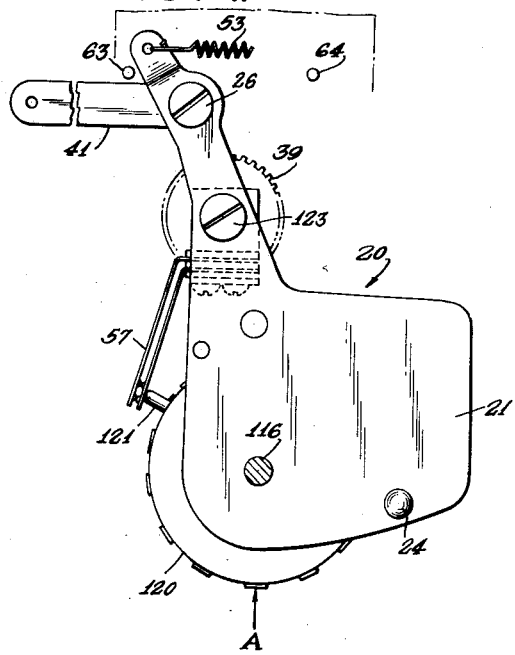
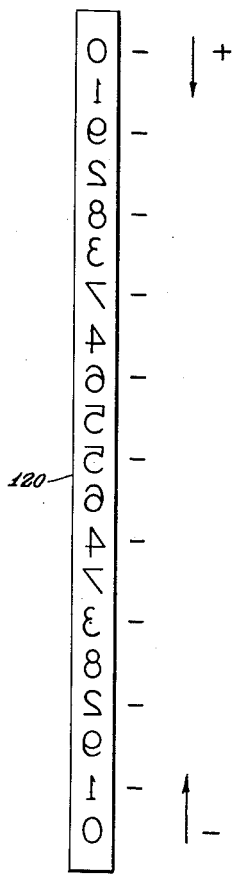
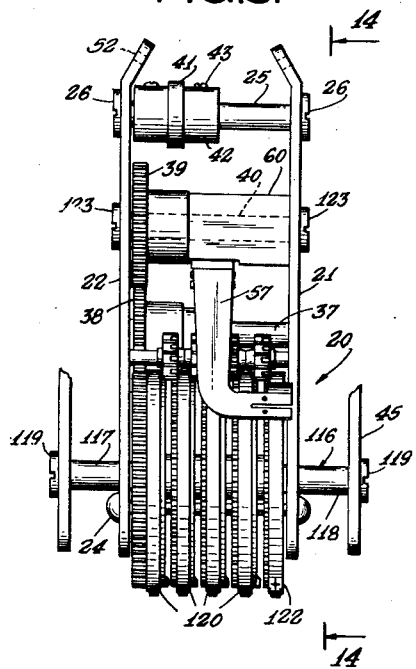
INVENTORS.
BENJAMIN COOPER
ALBERT HOHMANN
BY
ATTORNEY.

Patented Aug. 31, 1954

2,687,849

UNITED STATES PATENT OFFICE 2,687,849

PRINTING COUNTER HAVING TRUE
NEGATIVE TOTAL MEANS

Benjamin Cooper, New York, N. Y., and Albert
Hohmann, Teaneck, N. J.; said Hohmann assignor to said Cooper Application August 22, 1950, Serial No. 180,806

16 Claims. (Cl. 235—58)

This invention relates to counters and particularly to counters having associated mechanism for making printed records of the counter total.

A printing counter of the general type with which this invention is concerned is described and illustrated in Patent No. 2,293,934 of Benjamin Cooper, issued August 25, 1942.

Counters of this general type are usually arranged to be operatively driven for counting purposes in only one direction. This can be termed forwardly or additively starting from a zero position of all the digit wheels through numerals 1, 2, 3, etc. in an additive direction. Should the direction be reversed and the counting wheels driven rearwardly obviously the resultant computation is false. While by subtraction a true computation in reverse can be obtained the main difficulty in such reverse direction is when a zero position is reached.

Upon the next digital reverse movement of the counter will show a series of nines, for instance, 9999 for a four wheel counter, which is totally false.

In certain uses of printing counters it is imperative, however, that the counters are operatively active in both forward and reverse directions. For instance, in stress analysis this is necessary since the magnitude of the computation may be positive or negative, namely, plus or minus. A particular example of this is the picking off and recording of strain gage readings in wind tunnel testing apparatus where the values may be plus or minus.

Accordingly, it is the principal object of the present invention to provide means whereby a counter computation may be prepared in an additive direction for ultimate printing irrespective of whether the input is plus or minus.

A further object of the invention is to provide a printing counter which can be operated in either direction of rotation to give true readings of the input whether this be plus or minus.

Another object of the invention is to provide a counter, adapted to be associated with mechanism for making a printed record, which can be operated by rotation in either direction in an additive manner and which automatically places in a printing position additive digit wheels, under control of movements through a zero position.

Yet another object of the invention is to provide a counter of the type referred to, which can give true readings on a printed record whether the input be plus or minus and which can simultaneously give on the printed record a selected indication of a property of the input which is variable, this indication being set in the counter from a remote point.

Other objects will, in part, be obvious and in part hereinafter be pointed out.

The invention accordingly consists in the features of construction, combinations of elements and arrangement of parts which will be exemplified in the construction hereinafter described and of which the scope of application will be indicated in the appended claims.

In the accompanying drawings, in which is shown one of the various possible embodiments of the invention:

Figure 1 is a side elevational view of the essential parts of one form of counter unit embodying the present invention;

Figure 2 is a rear elevational view with parts cut away, of the counter of Figure 1;

Figure 3 is a front elevational view of the counter of Figure 1;

Figure 4 is a cross-sectional view on the line 4—4 of Figure 3;

Figure 5 is a side elevational view similar to Figure 1 but showing the counter unit carried by a supporting frame;

Figure 6 is a partial rear elevational view of the counter unit and frame of Figure 5;

Figure 7 is a rear elevational view of a first modified form of counter according to the present invention;

Figure 8 is a cross-sectional view taken on the line 8—8 of Figure 7 and looking to the left of Figure 7;

Figure 9 is a cross-sectional view of part of the unit of Figure 7 looking to the right on the line 9—9 of Figure 7;

Figure 10 is a side elevational view of the unit of Figure 7 showing the configuration of the frame;

Figure 11 is a wiring diagram of the operational parts of the counter unit, according to this invention;

Figure 12 is a wiring diagram of an operating part of the counter unit according to the modification of Figure 7;

Figure 13 is a detail of an operating part of of the counter unit of Figure 7;

Figure 14 is a side elevational view of a further modified form of printing counter according to the present invention;

Figure 15 is a front elevational view of the counter of Figure 14; and

Figure 16 is a diagrammatic representation of the digital arrangement of a digit wheel in the counter of Figure 14.

Generally, in practicing this invention, there are provided two sets of counter digits arranged in opposition and means are provided to place one or the other set of digits in printing position depending upon the direction of rotation of the drive therefor, namely, whether the quantity being measured is plus or minus with respect to a reference, the actual control of said means being effected by movements through zero position.

Preferably, besides the desired number of digit wheels for the purpose for which the counter is being used there is provided an additional digit wheel which will be devoid, however, of digits and will have thereon a plus sign for the positive set of counter digits and a minus sign for the negative set of counter digits, and when one or the other set of digits are placed in printing position, means are provided to establish the appropriate sign also in printing position.

Referring now in detail to Figures 1–6 of the drawings, the form of counter unit generally indicated at 20 has a frame comprising two side plates 21 and 22 spaced apart and rigidly held together by a stretcher rod 23 at the lower end, riveted over as at 24, and at the upper end by a shaft 25 which is held in place by screws 26 threaded into the bores shown dotted in Figure 1 at 27.

Mounted within the frame and between side plates 21 and 22 are two sets of conventional counter digit wheels 28 and 29, each comprising in the illustrated embodiment four digit wheels each having on its circumferential surface ten digits, one to zero, equiangularly spaced apart. Counter wheels 28 are rotatably mounted on a horizontal transverse shaft 31 and counter wheels 29 are rotatably mounted on a horizontal transverse shaft 32 and the first, or one to ten, digit wheel in each instance has a driving gear, 33a and 33b, for causing rotation of the digit wheels. The details of transfer from the digit wheels of each set are conventional and comprise coaxial gears 34 integral with the digit wheels, transfer gears 35 meshing therewith and gear segments 36 integral with the digit wheels and capable of meshing with their corresponding transfer gear at one position, whereby when each digit wheel rotates through number nine, the next digit wheel will be advanced by one-tenth of a revolution.

Mounted to freely rotate on a horizontal transverse shaft 37 is an intermediate gear 38 meshing with both of the driving gears 33a and 33b.

The main drive for the counters comprises a drive gear 39 freely mounted to rotate on a transverse horizontal shaft 40, gear 39 being in mesh with intermediate gear 38. Shaft 40 extends beyond the side plates 21 and 22 on both sides at 40a and 40b for the purpose hereinafter described.

Thus, by rotating drive gear 39 from any source the counter digit wheels will be operated and if the digits on the digit wheels of the two sets are in opposition, namely, sequentially facing in opposite directions circumferentially around the wheels, then whether the drive gear is rotated clockwise or counter-clockwise, one set of digit wheels will be operating to give a true count, namely, in an additive direction.

The unit of Figures 1 to 4 comprises a counter head having two sets of counter digit wheels which obviously can be mounted in a suitable frame by means of shaft extensions 40a and 40b and can be swung through an arc to place either set of digit wheels in the printing position, which is shown by arrow A on Figure 1.

To operate this arcuate movement, shaft 25 has pivotally mounted thereon a lever 41 which is held in position by a pair of collars 42 fixed to shaft 25 by set screws 43.

In Figures 5 and 6 there is shown the head 20 mounted in a frame by means of shaft extensions 40a and 40b. Frame 45 may be substantially U-shaped with a front retaining wall 46 for added strength. Shaft extensions 40a and 40b are mounted in the side walls thereof in any desired manner and also supported by the side walls of the frame is a horizontal transverse shaft 47 to which is fixedly mounted a gear 48 meshing with gear 39 and a helical gear 49 which latter is adapted to be rotated in one direction or the other from the input to be recorded by the printing counter unit.

It is an important feature of the present invention to provide for the swinging of head 20 within the frame 45, for the purpose defined, automatically under control of the direction of rotation of the main driving gear 49 when the counters pass through zero position.

It is a further important feature of the invention to provide for automatic indication of the direction of rotation when the record is printed so that it will be known whether the given count is plus or minus.

To this end, there is provided for each set of digit wheels another similar wheel 51 which, instead of having digits thereon, has indicia to indicate the property of its set of digit wheels, for instance, plus and minus signs. This extra wheel is geared to the others in conventional fashion as hereinbefore set forth, and to all intents and purposes serves as another digit wheel but without numerals. As previously set forth, when a digit wheel passes through number nine the next wheel is given one-tenth of a revolution.

When a set of digit wheels as illustrated achieve a total of 9999 the next additive or forward movement will change the digit wheels to 0000, namely, zero position.

Therefore, between these two values, the four digit wheels 29 and the indicia wheel 51 will all move simultaneously and in unison one-tenth of a revolution.

This movement is relied upon to cause automatic changing of the two sets of digits. The upper extremity of side plate 21 has a bore 52 in which one end of a spring 53 is held, the other end being held in a bore 54 in the back part of the frame 45. By this means one of the sets of digit wheels will normally be spring urged in printing position and action on lever 41 to move the other set into position will have to be against the action of said spring.

In Figure 5 the spring 53 is shown extended with the set 29 in printing position. The arm 41 may conveniently be moved to this position by a plunger of solenoid 55 (Figure 11) which is energized when required by either or both of a pair of normally open switches 56 and 57 which are in parallel and are connected by a lead 58 to one side B of a suitable source of electric supply, the other side of the solenoid being connected by a lead 59 to the other side C of the supply.

Switches 56 and 57 are carried by the head 20, switch 56 being attached to the rear lower end of the head by screws 58 and switch 57 being attached by screws 59 to a block 60 fixedly mounted on a shaft 40, which serves also as a spacer block for gear 39. As will be seen from Figures 1 and 5, each switch is so arranged that it lies in the path of a button on its associated indicia wheel. Switch 56 has an associated button 61 carried by a wheel 51, shown in Figure 2 in non-operating condition with the switch open. Switch 57 has an associated button 62 carried by the other wheel 51 shown in Figure 5 in operative position with the switch closed.

The operation of the counter unit is as follows:

Assuming the switches are both open and thus the solenoid 55 non-energized, then one set of digit wheels, actually 28, will be in printing position. Assuming the position is zeroed, which is where the device will always start and end in its operational cycle, then the indicia wheel will be so arranged that its indicia, for instance, a plus sign, is also in printing position.

If now helical gear 49 is rotated in a direction which is additive for the particular set of wheels in position then the counter will function to give a true recording when a print is taken in the usual manner, for example, in a manner similar to that disclosed in the prior Patent 2,293,934 mentioned above. If, however, the rotation is reverse or subtractive for the particular counter in position then, as previously explained, all the wheels will turn including the indicia wheel and button 61 will close switch 56 by moving upwardly in Figure 2. This energizes the solenoid 55 and pulls arm 41 against the action of spring 53, and the minus set of counter wheels 29 will be placed in printing position.

By this same arcuate movement of the head 20 in the frame 46 there is also accomplished the movement of button 62 into contact with switch 57 to maintain the solenoid circuit closed, since the set of wheels 29 are also at zero and thus move in unison to swing the button 61 upwardly to its position in Figure 5. The necessity for providing switch 57 as well as switch 56 is caused by the angle through which the head swings which causes a small movement of the set of wheels 28 in a direction tending to remove button 61 from its switch 56. As shown in Figure 5 button 61 is not in the best contact position with its switch 56 and to avoid possible failure of the device, switch 57 is provided to positively maintain the circuit.

While the set 29 continues to run in additive or forward direction the solenoid 55 will be kept energized. However, upon reversal of rotation to a subtractive direction, at a position of 9999 the wheels will again move in unison swinging to a zero position and removing buttons 61 and 62 from their respective switches 56 and 57. This deenergizes the solenoid 55 and allows the set of wheels 28 to be brought into printing position by means of spring 55, leaving wheels 29 at a zero position ready for future use.

In order to limit the angular movement of head 20 in the frame stops 63 and 64 are provided carried by frame 45 and projecting into the path of movement of the head. By this means, in the two extreme positions of the head with sideplate 22 in contact with one or the other pin 63, 64, the head will be so positioned that the set of counters to be in printing position will be properly in line with that position.

Since the drive through helical gear 49 is continuous it may be that when the count is ready to be printed, one or more of those digit wheels in printing position may be circumferentially displaced from alignment with the other digit wheels, which would result in an imperfect print. To overcome this problem, as a further feature of the present invention, means are provided to justify the position of the digit wheels and hold them in such position during the printing operation. This also, permitting the taking of a print while the counter is still operating.

To this end, there is mounted on the main drive shaft 47 to move therewith a star wheel 65 having ten points (Figures 6 and 9) and associated therewith is a pawl 66 having a contour at its engaging end substantially equivalent to the shape of the valleys of the star wheel. Pawl 66 is pivoted so as to be periodically swung into contact with a valley of star wheel 65 to hold the shaft 47 fixed during printing.

Pawl 66 is pivoted at a suitable fulcrum 67 (Figure 11) and is moved into and out of position by the plunger of a solenoid 68 which is energized when switch 69 is closed through lead 70 connected to B and lead 71 connected to C. One form of printer is also illustrated in Figure 11 comprising a platen 72 pivoted at a suitable fulcrum 73 and capable of pressing paper 74 fed in any suitable manner against the digit wheels 28 when switch 75 is closed to cause solenoid 76 to pull its plunger down.

If the action of solenoid 68 is correctly timed with the counter unit rotation, it is obvious that there is no need to stop the digit wheels for taking a print, since the pawl 66 will hold them in printing position for the fraction of a second necessary to obtain the print and upon removal of the pawl 66 from position in star wheel 65 the digit wheels can catch up without changing the essential count.

Depending upon the actual use of the counter unit and whether this runs relatively fast or slow, it is only a matter of correct association or of timing the operating to produce this result, in a conventional manner.

Switch 69 controlling the pawl 66 must be in closed position before solenoid 76 can be energized through lead 77 to point B of the supply and lead 70 switch 69 solenoid 68 and lead 71 to point C, this making certain that a good aligned point will be obtained.

The solenoids 55, 68 and 76 and the supports for fulcrums 67 and 73 can be suitably carried in association with the counter unit of the present invention in any deisred manner.

It is a further feature of the present invention to provide means whereby the printed record will also show which function of a variable property of the input driving helical gear 49, is in action for the particular reading, this being put into the counter from a remote point automatically. This particular feature is of use for example where a plurality of filters or screens are to be used in a test so that the record when printed can also show the actual filter used.

To this end, as shown in Figures 7 to 10, a portion of frame 45 is cut away at the rear to leave hollow supporting flanges 80 on which a coil or relay 81 is mounted by means of support 82 which is fixed to portions 80 by screws 83. An L-shaped laminated armature 84 is pivotally carried by support 82 as at 85 one arm of the L 84a being in position to be attracted to relay 81 when same is energized thereby rocking the other arm 84b of the L outwardly and to the right in Figure 10. A spring 86 keeps the armature in open position as in Figure 10, when relay 81 is not energized this extending from support 82 to a pin 87 mounted on a wall of the frame 46.

Pivotally mounted on the lower end of the arm 84b by a pivot pin 88 is a pawl member 89 having a spring 90 fastened to the end rearward of the pawl proper this spring having its other end held by a pin 91 attached to arm 84b. A ratchet wheel 92 is mounted to rotate together with a gear 93 around a pin 94 shown dotted in Figure 7, carried by the frame 45 and the pawl 89 is in contact at all times with said ratchet.

In order to prevent the ratchet wheel 92 from rotating in a reverse direction there is provided an opposed pawl 95 pivotally carried by frame 45 on a pin 96 and spring urged into contact with the ratchet wheel at a point substantially diametrically opposite pawl 89 by a spring 97 extending between a bore 98 in pawl 95 and a pin 99 carried by frame 45 (Figure 13).

When relay 81 is energized the arm 84a of armature 84 will be attracted thereto moving arm 84b clockwise and bringing pawl 89 backwards along the ratchet teeth, the other pawl 95 preventing the ratchet wheeel 92 from following. When the relay is no longer energized spring 86 will swing arm 84b counter-clockwise and pawl 89 will rotate the ratchet wheel by one tooth's distance until its shaped extremity comes to rest in the depth of the tooth. This rotates gear 93 by a similar amount which, in turn, rotates a gear 100 which, in turn, rotates a gear section 101 forming part of a digit or indicia wheel 102 coaxial with the digit wheels in printing position.

Obviously, the number of teeth on the ratchet wheel will determine the number of digits or like indicia on the indicia wheel 102.

As shown in Figure 12, the input signal to energize relay 81 is under control of a normally closed switch 103 mounted on the frame 84 in such position that a button 104 carried by arm 84b can open the switch when the armature has swung through its limits of travel in clockwise direction. This, therefore, forms a pulsing coil assembly which can be actuated from any input signal to put a desired character, numeral or other indicia in position for printing by rotating indicia wheel 102.

This input signal may be an automatic step-by-step impulse to indicate the number of the tests, for instance, in sequential order.

Alternatively, it may be used to indicate which one of a variable series is in position, such as a selected filter or screen.

The impulse may be manual or automatic and can be from a remote point.

In some uses of the counter unit according to Figures 7–10, it may be desirable to indicate at a remote point what particular indicia is in printing position on indicia wheel 102, for example, if the counter unit and its associated mechanism is completely enclosed. Alternatively, it may be desirable to provide means whereby the indicia wheel assembly initiates the action of placing in the correct filter, for example, to correspond with the indicia in printing position on wheel 102, whereby once the pulsing coil or relay 81 has been operated to the desired point thereafter not only will the right indicia be in printing position but also the right factor such as a filter or a screen will be inserted in operative position.

To this end, there is carried by pin 94 to move bodily with ratchet wheel 92 an insulating block 105 carrying a contact arm 107 which on one side makes permanent contact with the central common leg 108 of a selector switch 109 carried interiorly of frame 45 in any suitable manner, and on the other side at 110 makes step-by-step contact with switch segments 111 as ratchet wheel 92 rotates block 105 and thus the contact arm 107. Suitable external connections between common terminal 112 and the various terminals 113 of the contact segments 111 can be made for any purpose desired, the circuit selected being equivalent to the indicia at printing position on indicia wheel 102, by means of ratchet wheel 92 and pulsing coil 81. Since such external circuits form no part of the present invention such are not illustrated or described.

Within the spirit and scope of the present invention a further modified form is illustrated in Figures 14, 15 and 16 wherein the same principles are utilized but with a single set of digit wheels each with a double set of digits thereon. The pivot point for the head 20 in this modification is about the shaft 32 of Figure 1 by means of a shaft 116 having extensions 117 and 118 fixedly mounted in the side walls of frame 45 by screws 119 which will be screwed into bores in the shaft extensions in the usual manner. Digit wheels 120, again shown four in number, will be double the diameter of digit wheels 29 and have on their surfaces angularly spaced there-around two sets of digits from zero to nine placed in opposition.

The layout of the digits is shown diagrammatically in Figure 16 in strip form, this being the whole peripheral face of a digit wheel 120. The two sets of numerals are associated as shown with a number of each set followed by its reciprocal. If the wheel 120 rotates in a direction corresponding to the plus arrows an additive plus count will be made. If the rotation is reversed, the plus count will now be subtractive until zero is reached after which it will be additive in the direction of the minus arrow.

The method of operation is as previously given, namely, when all four counters pass through zero they move as a body to press pin 121 in contact with normally open switch 57, to close it, thus energizing the solenoid 55. This causes the head 20 to swing through a small arc, governed by stops 63, 64, to place the other set of numerals in printing position (arrow A). A plus and minus insignia wheel 122 is also used in this modification with both indicia on one wheel ready to occupy printing position with their respective set of digits. Shaft 40 no longer has its extensions 40a and 40b but is fixedly held in head 20 by screws 123 in suitable bores in the ends of shaft 40 in the usual manner.

It will thus be seen that the objects hereinbefore set forth have been achieved in providing a printing counter which can operate in either direction to give additive counts whether the input be plus or minus, the automatic control thereof being under the influence of movements through zero position of the digit wheels of the counter.

As various possible embodiments might be made of the above invention and as various changes might be made in the embodiments above set forth, it is to be understood that all matter herein described or shown in the accompanying drawings is to be interpreted as illustrative and not in a limiting sense.

Having thus described our invention, we claim as new and desire to secure by Letters Patent:

1. A printing counter comprising in combination a plurality of sets of digit wheels each set having a plurality of digit wheels adapted to print in a common printing position; a continually interengaging common drive for said sets; electromagnetic means for moving said sets into exacting vertically aligned columnar relation in the common printing position and switches controlling said electromagnetic means operated by movement of said sets of digit wheels through zero position.

2. A printing counter comprising in combination a plurality of counter digit wheels, each wheel having two sets of numerals from zero to nine on its peripheral face arranged in opposition so that rotating in one direction will be additive for the first set and subtractive for the second set and rotation in the other direction will be additive for the second set and subtractive for the first set; a drive means for rotating said digit wheels in one or the other direction; and means operated by the passing through zero of either set of numerals in a subtractive direction for placing the additive set of numerals in a printing position.

3. A printing counter comprising in combination a plurality of counter digit wheels, each wheel having two sets of numerals from zero to nine on its peripheral face arranged in opposition so that rotating in one direction will be additive for the first set and subtractive for the second set and rotation in the other direction will be additive for the second set and subtractive for the first set; a drive means for rotating said digit wheels in one or the other direction; means operated by the passing through zero of either set of numerals in a subtractive direction for placing the additive set of numerals in a printing position; and a further digit wheel having insignia thereon indicating which set of numerals are in additive rotation at printing position being said further digit wheel operated also by the passing through zero in a subtractive direction of either set of numerals.

4. A printing counter comprising in combination a frame; a head mounted to swing within said frame in an arcuate path; a pair of sets of opposed digit wheels rotatably mounted in said head to move therewith; gearing common to said two sets to rotate them in one or the other direction; an input drive shaft; an input drive gear; gearing between said gearing common to said two sets and said input drive shaft; a spring between said head and said frame normally maintaining said head in position with the first of said sets in a selected printing position; an operating lever connected to said head adapted to be moved against the action of said spring by electromagnetic means to swing said head into a position with the second of said sets in said printing position; a switch mounted on the frame in the path of a button moving with the first set when the wheels of the set move in unison through zero upon subtractive rotation of the first set, to close the switch to cause energizing of said electromagnetic means and swing said second set into printing position and hold same there until the wheels of said second set move in unison through zero upon subtractive rotation, thereby opening said switch.

5. A printing counter comprising in combination a frame; a head mounted therewithin to swing in an arcuate path; a pair of sets of digit wheels rotatably mounted in said head with their numerals so opposed that in one direction the one set will be additive and in the other direction the other set will be additive; resilient means for normally maintaining one of said sets at a printing position; a further digit wheel for each set carrying insignia suitable to identify its set; and means including a button mounted on each of said further digit wheels rotatable by the movement of its set when the wheels pass through zero in subtractive direction to close normal open switches one for each further digit wheel and thereby actuate electromagnetic means to cause said head to swing in an arc to place and maintain said other set in said printing position until said switches are opened by action of the digit wheels of the set now in printing position passing through zero in a subtractive direction.

6. A printing counter as claimed in claim 4 wherein a further switch is mounted on the frame and an operating button moves with the wheels of the second set when they move in unison through zero upon subtractive rotation, said switches being of normally open type and being in parallel in the electromagnetic means circuit and said buttons operating substantially simultaneously to close or open the switches.

7. A printing counter comprising in combination a frame; a head mounted to swing within the frame in an arcuate path; a plurality of counter digit wheels mounted coaxially, each wheel having two sets of numerals from zero to nine arranged equiangularly about its peripheral face in opposition with each number followed by its reciprocal; a main drive; gearing between said main drive and said digit wheels to rotate them in one or the other direction so that one of the sets of numerals will always be additive in action, when rotated, with the other subtractive; resilient means between said head and said frame for maintaining said head normally in one position with one set of numerals at a selected printing position; means including an operating lever connected to said head and capable of swinging said head through an arc by electromagnetic means to a position with the other set of numerals in said printing position; a normally open switch adapted to control the action of the electromagnetic means; and an actuator button for closing and opening said switch carried by one of the plurality of digit wheels moving with said wheels when they move in unison through zero upon subtractive rotation.

8. A printing counter comprising in combination a frame; a head mounted to swing within the frame in an arcuate path; a plurality of counter digit wheels, each wheel having two sets of numerals from zero to nine arranged equiangularly about its peripheral face in opposition with each number followed by its reciprocal; a main drive; gearing between said main drive and said digit wheels to rotate them in one or the other direction so that one of the sets of numerals will always be additive in action, when rotated, with the other subtractive; means between said head and said frame for maintaining said head normally in one position with one set of numerals at a selected printing position; means including an operating lever connected to said head and capable of swinging said head through an arc to a position with the other set of numerals in said printing position; a normally open switch adapted to control the action of the means; and an actuator for closing and opening said switch moving with said wheels when they move in unison through zero upon subtractive rotation.

9. A printing counter as claimed in claim 7 wherein said button is carried on a digit wheel devoid of numerals and having thereon two selected insignia spaced angularly thereon to be in printing position alternatively by movement of said wheels in unison, to indicate which set of numerals is in printing position.

10. A printing counter of the type described comprising in combination a first counting means for counting in an additive manner in one direction of rotation; a second counting means for counting in an additive manner in the other direction of rotation; a common drive means for rotating said first and second counting means in one or the other direction; control means for placing either the first or second counting means at a selected printing position controlled by passing whichever counting means is in printing position through zero in a subtractive direction; a frame for supporting all said means; a pulsing coil carried by the frame adapted to receive remote impulses; an indicia wheel with its indicia in printing alignment with the numerals thereof, said indicia wheel being mounted by said frame to rotate; gears rotating said indicia wheel; and driving means connected to said gears to give rotation to said indicia wheel; under control of said pulsing coil, whereby impulses received by said pulsing coil will change the position of said indicia wheel to indicate the condition signalled, in line with whichever of said counting means is in printing position.

11. A printing counter of the type described comprising in combination a first counting means for counting in an additive manner in one direction of rotation; a second counting means for counting in an additive manner in the other direction of rotation; a common drive means for rotating said first and second counting means in one or the other direction; means for placing either the first or second counting means at a selected printing position controlled by passing whichever counting means is in printing position through zero in a subtractive direction; a frame for supporting all said means; a pulsing coil carried by the frame adapted to receive remote impulses; an indicia wheel coaxial with that counting means which is in printing position and with its indicia in printing alignment with the numerals thereof, said indicia wheel being mounted by said frame to rotate; gears rotating said indicia wheel; a ratchet drivingly connected to said gears to give step-by-step rotation to said indicia wheel; a pawl operatively connected to said pulsing coil and in contact with said ratchet, whereby impulses received by said pulsing coil will change the position of said indicia wheel to indicate the condition signalled, in line with whichever of said counting means is in printing position; a selector switch contact mounted to move with said ratchet carried by said frame; and a multi-terminal selector switch carried by said frame with said contact in active position thereon, whereby the position of said indicia wheel can be remotely indicated through external selector switch circuits.

12. A printing counter according to claim 10 wherein said driving means include a ratchet drivingly connected to said gears to give a step-by-step rotation to said indicia wheel and a pawl operatively connected to said pulsing coil and in contact with said ratchet.

13. A printing counter comprising in combination two sets of digit wheels arranged in opposition; a continually interengaging common drive for said sets of digit wheels; and means controlled by movement through zero position to place one or the other of said sets in reacting vertically aligned columnar relation in a common printing position, and means to positively hold said set of digit wheels aligned in said exacting columnar relation in said common printing position momentarily while printing takes place.

14. A printing counter comprising in combination a plurality of counter digit wheels each wheel having two sets of numerals from zero to nine on its peripheral face arranged in opposition so that rotating in one direction will be additive for the first set and subtractive for the second set and rotation in the other direction will be additive for the second set and subtractive for the first set; a drive means for rotating said digit wheels in one or the other direction; and means operated by the passing through zero of either set of numerals in a subtractive direction for placing the additive set of numerals in a printing position, a star wheel mounted to move with said drive means; a pawl periodically engageable with the valleys of the teeth of the star wheel to immobilize said drive means while printing takes place; and means for moving said pawl into engagement with said star wheel while printing.

15. A printing counter including a first counting means adapted to count true plus values, a second counting means adapted to count true minus values, continually interengaging common means for concurrently actuating both counting means, means to automatically move the first counting means to a predetermined columnar position when the values registered thereon are plus values, and means to automatically move the first counting means out of said predetermined position and said second counting means automatically into exact vertical alignment said predetermined columnar position when the second counting means has minus values registered thereon.

16. A printing counter including a first counting means adapted to count true plus values, a second counting means adapted to count true minus values, rockable means for supporting said first and second counting means, continually interengaging common means for concurrently actuating both counting means, means to automatically rock said rockable means to position said first counting means at a predetermined columnar position when the values registered on said first counting means are plus values, and means to automatically rock said rockable means to position the second counting means in exact vertical columnar alignment at said predetermined columnar position when the values registered on said second counting means are minus values.

References Cited in the file of this patent

UNITED STATES PATENTS

| Number | Name | Date |
|---|---|---|
| 1,033,303 | Carlin | July 23, 1913 |
| 1,288,333 | Whiting | Dec. 17, 1918 |
| 1,374,762 | Poole | Apr. 12, 1921 |
| 1,376,518 | Duckstine | May 3, 1921 |
| 1,514,954 | Crumpton | Nov. 11, 1924 |
| 2,115,410 | Cooper | Apr. 26, 1938 |
| 2,396,188 | Mehan et al. | Mar. 5, 1946 |

FOREIGN PATENTS

| Number | Country | Date |
|---|---|---|
| 86,966 | Sweden | July 28, 1936 |
| 613,616 | Great Britain | Dec. 1, 1948 |